United States Patent
Laake

(10) Patent No.: US 8,391,562 B2
(45) Date of Patent: Mar. 5, 2013

(54) WATER TABLES MAPPING

(75) Inventor: Andreas Laake, Kingston (GB)

(73) Assignee: WesternGeco L.L.C., Houston, TX (US)

(*) Notice: Subject to any disclaimer, the term of this patent is extended or adjusted under 35 U.S.C. 154(b) by 1150 days.

(21) Appl. No.: 12/267,576

(22) Filed: Nov. 8, 2008

(65) Prior Publication Data

US 2010/0119102 A1    May 13, 2010

(51) Int. Cl.
*G06K 9/00*    (2006.01)

(52) U.S. Cl. .................. 382/109; 382/113; 382/100

(58) Field of Classification Search .................. None
See application file for complete search history.

(56) References Cited

U.S. PATENT DOCUMENTS

2007/0264781 A1   11/2007   Behammer
2008/0133554 A1   6/2008   Lee et al.

FOREIGN PATENT DOCUMENTS

WO    2004097459 A    11/2004

OTHER PUBLICATIONS

Aksoy et al. "Landslide susceptibility mapping of the slopes in the residual soils of the Mengen region (Turkey) by deterministic stability analyses and image processing techniques", Engineering Geology, 44, (1996) 147-161.*
Chen et al. "Filtering to Remove Cloud Cover in Satellite Imagery", LARS Symposia, paper 152 (1976) 4A/27-31.*
Moore et al. "Digital Terrain Modelling: A Review of Hydrological, Geomorphological, and Biological Applications", Hydrological Processes, vol. 5, 3-30 (1991).*
Hutchinson, "New Procedure for Gridding Elevation and Stream Line Data With Automatic Removal of Spurious Pits", Journal of Hydrology, 106 (1989) 211-232.*
Whitman et al. "Spatial Interrelationships between Lake Elevations, Water Tables, and Sinkhole Occurrence in Central Florida: A GIs Approach", Photogrammetric Engineering & Remote Sensing, Oct. 1999, 1169-1178.*
Paul et al. "Combining satellite multispectral image data and a digital elevation model for mapping debris-covered glaciers", Remote Sensing of Environment 89 (2004) 510-518.*
Lee et al. "Satellite-Based Imagery Techniques for Daytime Cloud/Snow Delineation from MODIS", J. Appl. Meteor., 44, 987-997.*
Laake et al. : "Using satellite imagery aids seismic surveys in planning, acquisition and processing" WorldOil.com; Exploration Report; vol. 225, No. 9.*
Bishop et al., Chapter 8: Cartography and Visualization in Mountain Geomorphology, Geographic Information Science and Mountain Geomorphology, 2004.
PCT Search Report, dated May 14, 2010, Application No. PCT/US2009/062058.
Ground Penetrating Radar(GPR) Technology, http://www.sensoft.ca/applications/geotech/casestudy/cs_watertable.html, 2008.
EMP-400, Multi-Frequency EM Conductivity Meter, Nov. 2007, http://www.geophysical.com/Profiler.htm.
Yuji Maruo et al, Application of Geographic Information System (GIS) for Groundwater Resource Management, 2006.

* cited by examiner

*Primary Examiner* — Tom Y Lu
*Assistant Examiner* — Thomas Conway

(57) ABSTRACT

Described herein are implementations of various technologies for a method for mapping water table depths. In one implementation, a satellite image of an area of interest may be received. The satellite image may comprise a red spectrum, a green spectrum and a blue spectrum. A first map may be generated that identifies only water features on the satellite image. The first map may be convolved with a digital elevation model of the area of interest to generate a second map. The second map may identify elevations of the water features on the satellite image. An interpolation algorithm may be applied to the second map to generate a third map. The third map may identify water tables and elevations for the water tables on the satellite image.

23 Claims, 5 Drawing Sheets

WATER TABLES MAPPING

BACKGROUND

1. Field of the Invention

Implementations of various technologies described herein generally relate to methods and systems for water table depth mapping.

2. Description of the Related Art

The following descriptions and examples are not admitted to be prior art by virtue of their inclusion within this section.

The depth of the water table is useful for seismic exploration because the water table generally represents the first seismic event. The air in the pore space of the rock near the surface above the water table is replaced with water, which usually results in a significant increase of the acoustic impedance and hence a reflection. The water table may also represent the first refractor. For seismic imaging, information about the depth of the water table below the surface may be of great importance. The information about the thickness of the weathering layer, i.e., the rock or soil layer between the surface and the water table, may contribute to the statics corrections.

State-of-the-art methods for measuring water tables depend on the availability of drilling or geophysical equipment on the ground to obtain information about the water table depth. This approach is often not possible in remote swampy terrain, such as the Arctic. Furthermore, the acquisition process may be limited to the acquisition of 2D line profiles, which results in considerable time and effort for mapping the water tables in large areas.

Presently, water table measurements are carried out for ground water management and geotechnical projects. The water table may be either directly measured from invasive methods, such as, water well drilling, or inferred using geophysical methods. Geophysical methods are generally non-invasive and hence, more environmentally sustainable than drilling. Table 1 below provides an overview of the most common methods for water table mapping.

TABLE 1

| Method | | Technology | Deliverable |
| --- | --- | --- | --- |
| Invasive methods | Water Well Drilling | Mechanical probing | 1D point profiles |
| Geophysical methods | GPR | Microwaves | 2D line profiles |
| | Geoelectric | EM conductivity | 2D line profiles |
| | Seismo-electric | Elastic-EM conversion | 2D line profiles |
| | Seismic | Elastic waves | 1D, 2D, 3D profiles |

Geophysical methods include ground penetrating radar (GPR), geoelectric methods, and seismic methods. Ground penetrating radar emits microwave radar pulses, the scattering of which at the water table is interpreted to map its depth. Geoelectric methods measure the electric or electromagnetic properties of the subsurface and interpret the response of the change of these properties at the water table for its depth. Geoelectric methods use either the self-potential (passive method) or the earth response upon an induced electro-magnetic signal (active). Seismic methods employ elastic waves and map the arrival of their reflection or refraction at the water table to infer its depth.

SUMMARY

Described herein are implementations of various technologies for a method for mapping water table depths. In one implementation, a satellite image of an area of interest may be received. The satellite image may include a red spectrum, a green spectrum and a blue spectrum. A first map may be generated that identifies only water features on the satellite image. The first map may be convolved with a digital elevation model of the area of interest to generate a second map. The second map may identify elevations of the water features on the satellite image. An interpolation algorithm may be applied to the second map to generate a third map. The third map may identify water tables and elevations for the water tables on the satellite image.

In another implementation, the method may further include removing noise pertaining to clouds from the satellite image, removing noise pertaining to ice and snow from the satellite image, generating a first map that identifies water features on the satellite image, convolving the first map with a digital elevation model of the area of interest to generate a second map that identifies elevations of the water features on the satellite image, applying an interpolation algorithm to the second map to generate a third map that identifies water tables and elevations for the water tables on the satellite image, subtracting the elevations for the water tables from the digital elevation model to generate a fourth map that identifies depths of the water features on the satellite image; and using the fourth map for seismic acquisition.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraph provides a brief summary of various techniques described herein. In general, various techniques described herein are directed to a method for mapping water tables, including their elevations and depths. A multi-spectrum satellite image may be taken of an area of interest. The area may be of interest for seismic acquisition pertaining to hydrocarbon or water exploration. The pixels of the image that represent features, such as clouds, ice and snow may be removed from the image. Water features, such as lakes, swamps, and the like may be identified. The identification of clouds, ice, snow, and water features may be performed using a spectral analysis on the electromagnetic wavebands of each pixel in the image. The elevation of the water features may be determined through the use of a digital elevation model of the area of interest. The water features may then be connected using an interpolation algorithm, which may plot water tables that connect the water features. The depths of the water tables may then be mapped by subtracting the water table elevations from the elevations in the digital elevation model. One or more implementations of various techniques for mapping water table depths will now be described in more detail with reference to FIGS. 1-5 in the following paragraphs.

Figure 1:
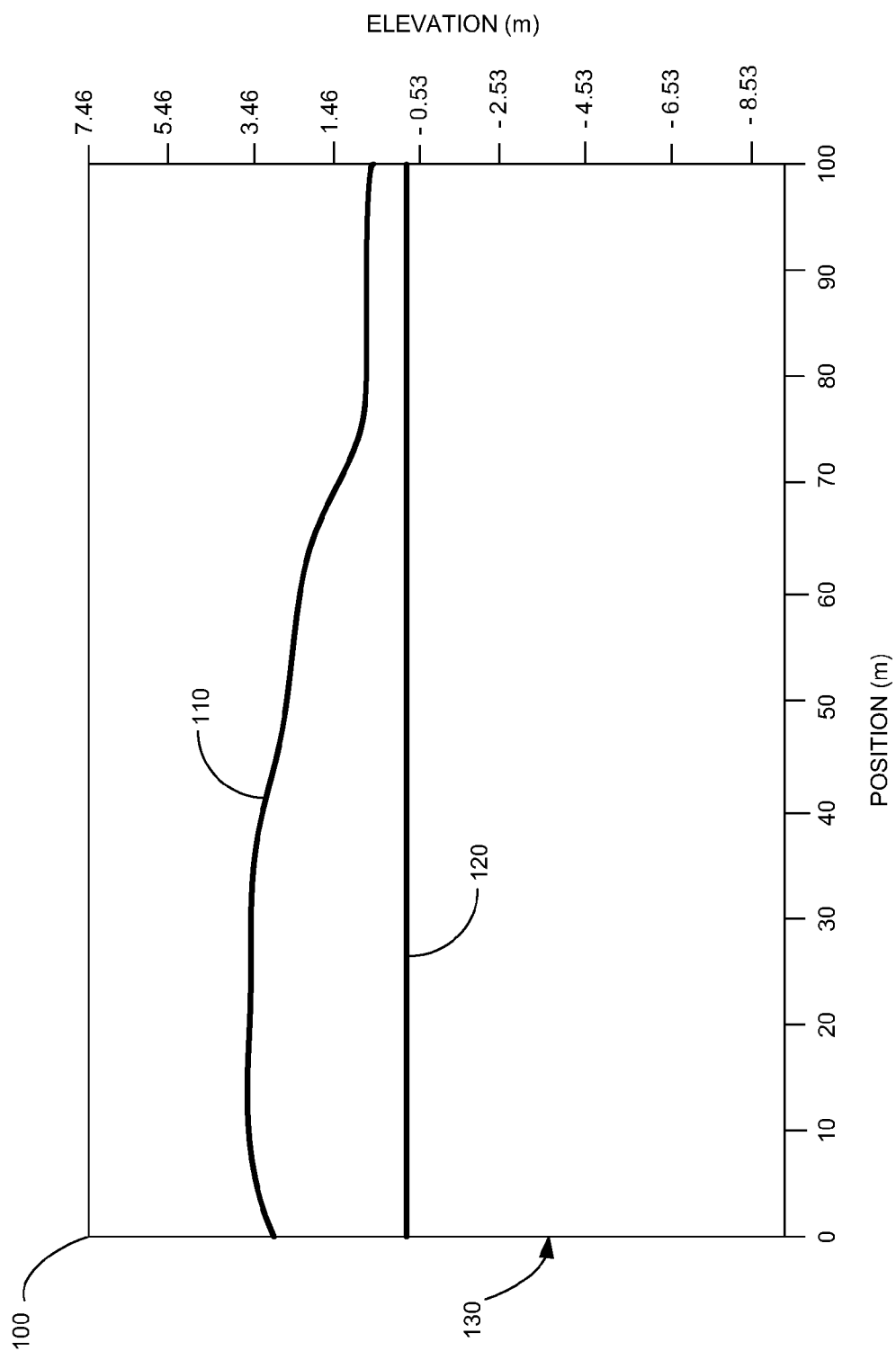
FIG. 1 illustrates a graph of a 2-dimensional line profile showing a water table in accordance with one or more implementations of various techniques described herein.

FIG. 1 illustrates a 2-dimensional (2-D) line profile 100 showing a water table 120 in accordance with one or more implementations of various techniques described herein. The X-axis of the 2-D line profile 100 indicates a relative position, in meters, of a profiled subsurface 130. The Y-axis of the 2-D line profile indicates elevation above sea level of the profiled subsurface 130 in meters. The 2-D line profile 100 illustrates a topography of the surface 110 and the depth of the water table 120. The 2-D line profile 100 may be provided by the geophysical methods described above in Table 1.

It should be noted that shallow water tables may have an impact on the access for vehicles. If the ground is water saturated, vehicles with individual wheels often cannot operate in this area. Therefore, mapping of the water table may provide useful information for logistic planning of seismic operations in remote areas. Other useful applications of information about the depth of the water table are summarized in Table 2 below.

TABLE 2

| Application | Information | Deliverable |
|---|---|---|
| Seismic logistics | Shallow water table | access limitation for individual wheeled vehicles outside the winter season |
| | Deep water table | no obstruction of logistics from water saturated soft ground |
| Seismic data processing | Water table | often first refractor and first reflector. Water table marks the bottom of the weathering layer for P-waves, i.e. the zone of high lateral and vertical variability of elastic parameters |

Figure 2:
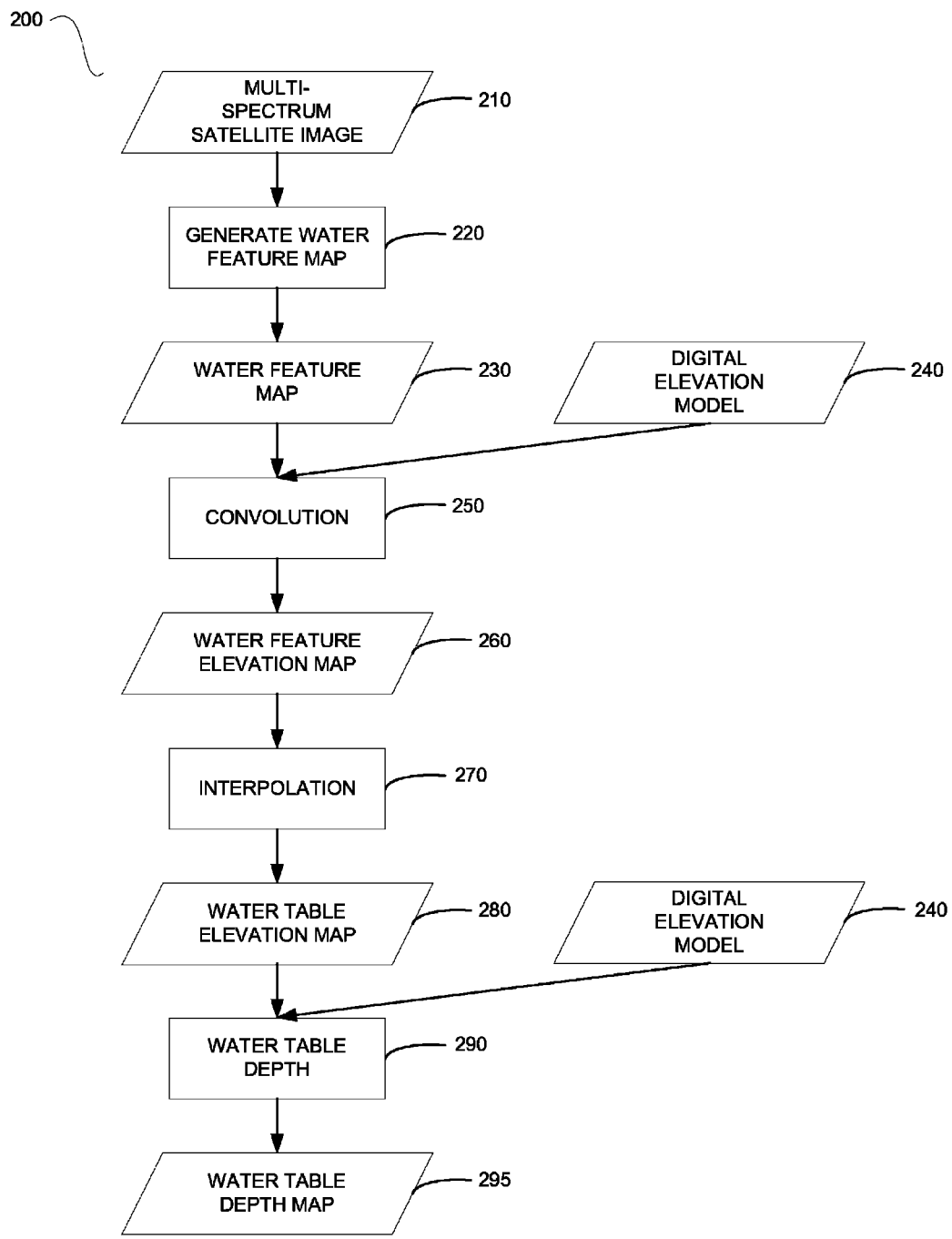
FIG. 2 illustrates a data flow diagram of a method for mapping water table depths according to implementations described herein.

FIG. 2 illustrates a data flow diagram of a method 200 for mapping water table depths according to implementations described herein. A multi-spectrum satellite image 210 may be received for input to a generate water feature map process 220. The multi-spectrum satellite image 210 may also be referred to herein as the satellite image 210. The generate water feature map process 220 may generate a water feature map 230 that identifies only water features on the satellite image 210. The water features may include the sea, lakes, swamps, rivers, and the like. The generate water feature map process 220 is described in greater detail with reference to FIG. 3.

The satellite image 210 may include an image of an area of interest. The area of interest may be an area of groundwater management, hydrocarbon exploration, or other geotechnical projects.

The spectra of the satellite image 210 may include the red spectrum, the green spectrum, and the blue spectrum. The red spectrum may represent a lithology-sensitive short wave infrared band. The green spectrum may represent a chlorophyll-sensitive near infrared band. The blue spectrum may represent the visible green band. It should be understood, however, that other types of band combinations that are sensitive to lithology, chlorophyll and the visible green band may also be used in various implementations described herein. For example, the visible green band may be replaced by the visible blue band to represent the blue spectrum. In one implementation, the satellite image 210 may be composed of a set of pixels. In such an implementation, each pixel may have values for red, green, and blue spectra of light.

The water feature map 230 and a digital elevation model 240 may be input to a convolution process 250. The digital elevation model 240 may be a digital representation of ground surface topography or a subsurface horizon. In one implementation, the digital representation may be a set of pixels. In such an implementation, a pixel may be associated with a location and the elevation at that location. The convolution process 250 may generate a water feature elevation map 260 which identifies elevations of the water features in the satellite image 210.

The convolution process 250 may determine the elevations of the water features by correlating the locations of the water features in the water feature map 230 to the elevations at those locations in the digital elevation model 240.

The water feature elevation map 260 may be input to an interpolation process 270, which may apply an interpolation algorithm to the water feature elevation map 260 to generate a water table elevation map 280. In one implementation, the interpolation algorithm may be linear. In another implementation, the interpolation algorithm may be spatial. The water table elevation map 280 may identify water tables and elevations for the water tables on the satellite image 210.

The interpolation algorithm may approximate the location and elevation of the water tables by connecting the water features in the water feature elevation map 260. The interpolation algorithm may operate with the assumption that the free water surfaces of water features, such as lakes and the sea, represent the level of the water tables at those particular locations.

In one implementation, the interpolation algorithm may grid the elevations for the water features. In such an implementation, the gridded elevations may be interpolated to the pixel density of the digital elevation model 240.

The interpolation algorithm may suffer from subsurface geological features, which may obstruct the ground water flow, such as moraines from glacial deposits. Often these features are correlated with the surface topography and form geomorphological anomalies. In this case, the generate water feature map process 220 may be expanded to identify geomorphological anomalies.

For example, a water table may remain close to the surface in a ground moraine. This may implicate the depth of a water table that connects a water feature in the ground moraine to a water feature beyond a lateral or terminal moraine of the ground moraine. In such a scenario, the interpolation algorithm may calculate a water table depth that remains stable within the ground moraine, and that becomes steeper beyond the lateral or terminal moraine.

In one implementation, the water table elevation map 280 may be input with the digital elevation model 240 to a depth process 290. The depth process 290 may generate a water table depth map 295. The water table depth map 295 may identify the depths of the water tables on the water table elevation map 280.

The depth process 290 may calculate the depths of the water tables by subtracting the elevations for the water tables from the elevations in the digital elevation model 240. In one implementation, negative and zero depths for the water tables may be removed from the water table elevation map 280.

Figure 3:
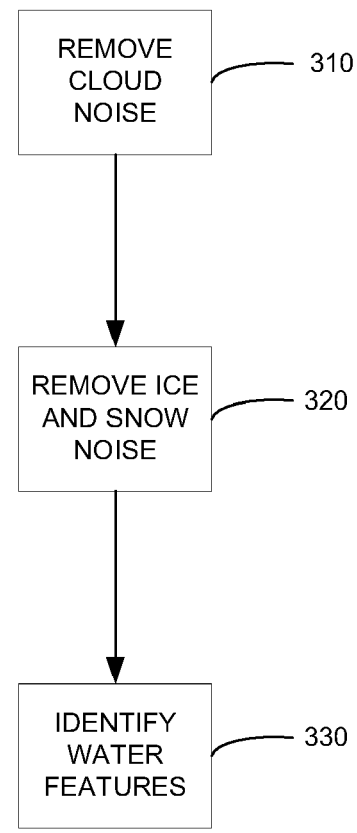
FIG. 3 illustrates a flowchart of a process to generate a water feature map according to implementations described herein.

FIG. 3 illustrates a flowchart of the process 220 to generate a water feature map 230 according to implementations described herein. The process 220 may be performed on the satellite image 210. Additionally, it should be understood that while the operational flow diagram indicates a particular order of execution of the operations, in some implementations, certain portions of the operations might be executed in a different order.

Often, features such as clouds, ice, and snow may mask the terrain of the area of interest. As such, these features may be treated as noise. Accordingly, the noise may be removed from the satellite image. At step 310, noise pertaining to clouds may be removed from the satellite image 210. At step 320, noise pertaining to snow and ice may be removed from the satellite image 210.

At step 330, the water features in the satellite image 210 may be identified. In one implementation, the water features may be identified in the pixels remaining after the noise is removed in the satellite image 210 as described above. In another implementation, all remaining features in the satellite image 210 that do not represent water features may be treated as noise. Accordingly, this noise may be removed, leaving the water feature map 230, which only identifies water features. The steps 310-330 are described in greater detail with reference to FIG. 4.

Figure 4:
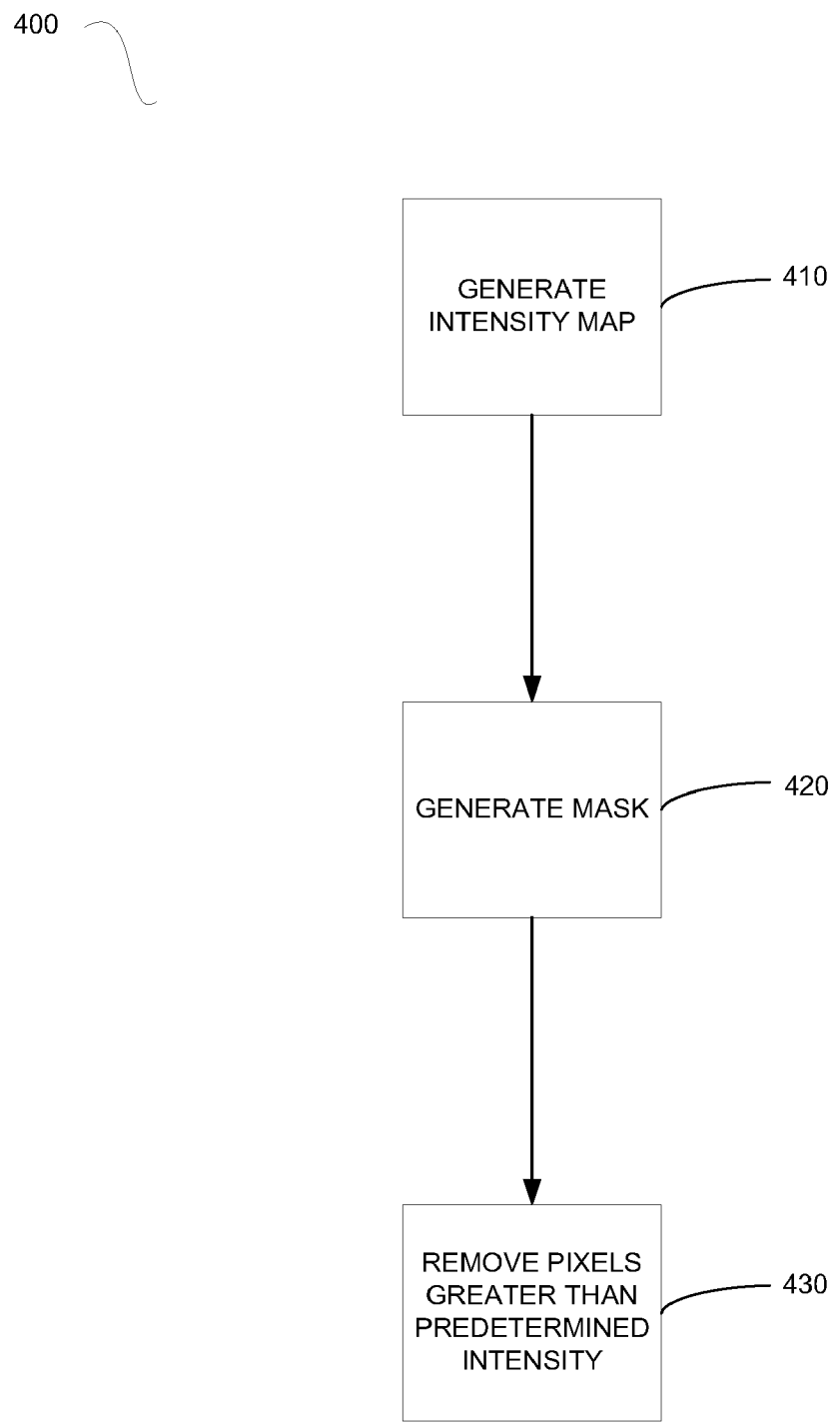
FIG. 4 illustrates a method for removing noise from a satellite image in accordance with implementations described herein.

FIG. 4 illustrates a method 400 for removing noise from the satellite image 210 in accordance with implementations described herein. The method 400 may be performed in each of the steps 310-330. Additionally, it should be understood that while the operational flow diagram indicates a particular order of execution of the operations, in some implementations, certain portions of the operations might be executed in a different order.

At step 410, an intensity map may be generated by convolving multiple spectra of the satellite image 210. The spectra that are convolved may depend on the type of noise being removed. Because clouds have a similar high specular reflectance in all three visible bands, the red, green, and blue spectra may be convolved to remove noise pertaining to clouds.

On the other hand, ice and snow show high specular reflectance in the visible green and near infrared bands. Accordingly, the green and blue spectra may be convolved to remove noise pertaining to ice and snow.

With regard to water features, water absorbs all electromagnetic energy from visible red to infrared. Accordingly, the red and green spectra may be convolved to remove noise pertaining to pixels that do not represent water.

The intensity map may contain summed values of the convolved spectra for each pixel in the satellite image 210. In one implementation, the summed values may be normalized across the intensity map.

At step 420, a mask may be generated. Noise may be removed through the use of masks. As stated previously, the satellite image 210 may be composed of a set of pixels. The mask may be composed of a set of pixels that correspond to the pixels in the satellite image 210. The masks may identify noise in the satellite image 210 by assigning binary values to each pixel in the mask. In one implementation, if the noise, such as a cloud, is detected, the pixel value may be 1. If the feature is not detected, the pixel value may be 0.

The noise may be detected by comparing the normalized values in the intensity map to a predetermined value for each type of noise. Normalized values that exceed the predetermined values may indicate the specified noise. For example, the predetermined value for cloud noise may be 50%. The predetermined value for ice and snow noise may also be 50%. The predetermined value for non-water feature noise may be 1%.

At step 430, the pixels having a greater intensity than the predetermined values may be removed from the satellite image 210. In other words, the mask may be applied to the satellite image 210. If a pixel in the mask has a value of 1, the corresponding pixel in the satellite image 210 may be removed.

Figure 5:
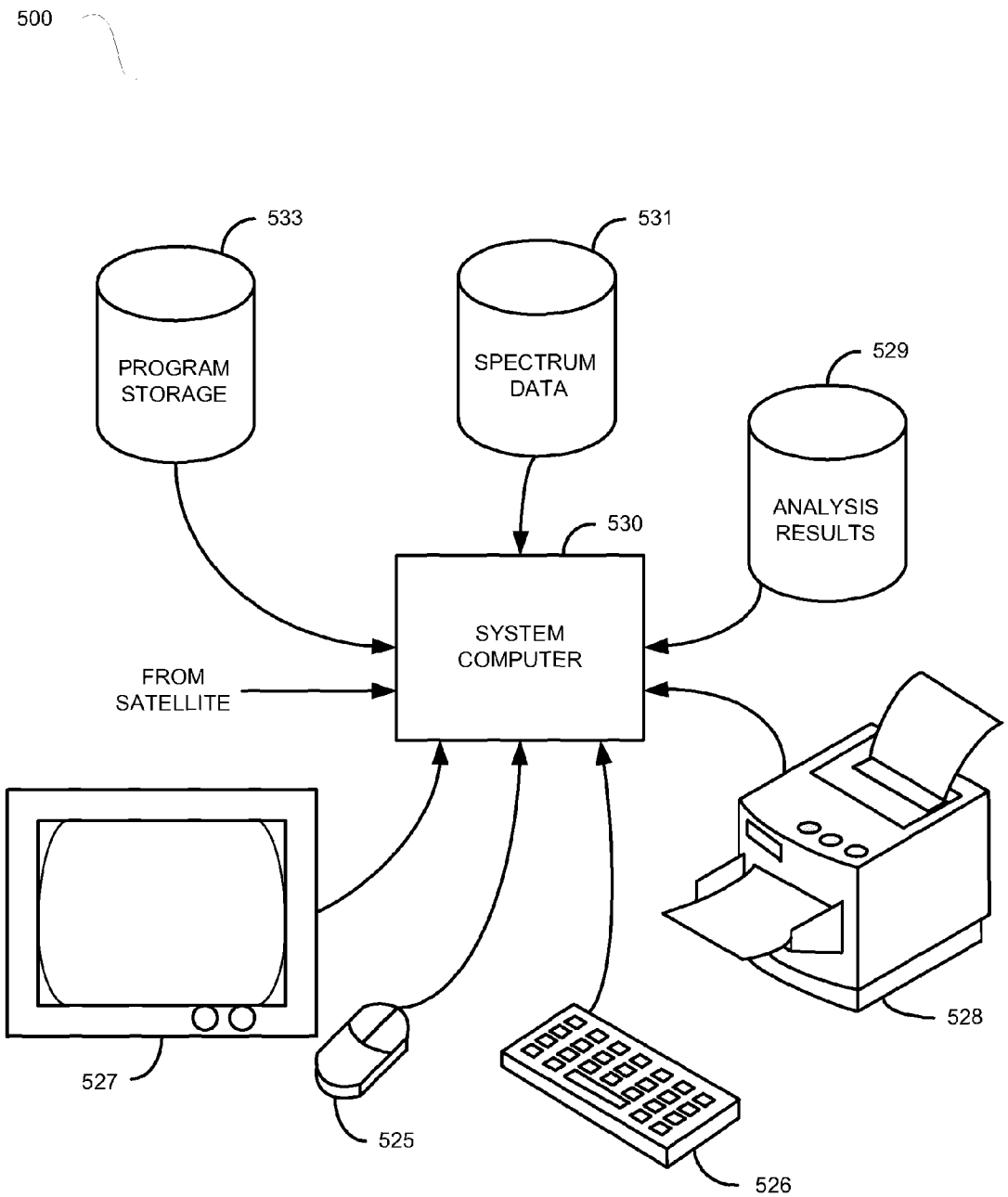
FIG. 5 illustrates a computer network into which implementations of various technologies described herein may be implemented.

FIG. 5 illustrates a computing system 500, into which implementations of various technologies described herein may be implemented. The computing system 500 may include one or more system computers 530, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, mini-computers, mainframe computers, and the like.

The system computer 530 may be in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, spectrum data for the satellite image 210 may be stored in disk storage device 531. The system computer 530 may retrieve the appropriate data from the disk storage device 531 to process spectrum data according to program instructions that correspond to implementations of various technologies described herein. The program instructions may be written in a computer programming language, such as C++, Java and the like. The program instructions may be stored in a computer-readable medium, such as program disk storage device 533. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 530.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 530 may present output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the area of interest. The system computer 530 may be in communication with a satellite (either directly or via a recording unit, not shown), to receive signals indicative of the satellite image 210. These signals, after conventional formatting and other initial processing, may be stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for mapping water tables, comprising:
   receiving a satellite image of an area of interest;
   generating a first map that identifies only water features on the satellite image;
   convolving, using a computer, the first map with a digital elevation model of the area of interest to generate a second map that identifies elevations of the water features on the satellite image;
   applying an interpolation algorithm to the second map to generate a third map that identifies water tables and elevations for the water tables on the satellite image; and
   subtracting the elevations for the water tables from the digital elevation model.

2. The method of claim 1, further comprising removing noise pertaining to clouds from the satellite image.

3. The method of claim 1, further comprising removing noise pertaining to ice and snow from the satellite image.

4. The method of claim 1, wherein the interpolation algorithm is one of:
   a linear interpolation algorithm; or
   a spatial interpolation algorithm.

5. The method of claim 1, wherein the interpolation algorithm calculates a water table depth that remains stable within a ground moraine and becomes steeper beyond a lateral or terminal moraine associated with the ground moraine.

6. The method of claim 1, wherein the water tables represent a first seismic event.

7. The method of claim 1, wherein applying the interpolation algorithm to the second map comprises:
   gridding the elevations for the water features; and
   interpolating the gridded elevations to the pixel density of the digital elevation model.

8. The method of claim 1, further comprising planning a seismic acquisition in the area of interest based at least in part on the third map.

9. The method of claim 1, wherein generating the first map that identifies water features on the satellite image comprises generating the first map that identifies only water features on the satellite image.

10. The method of claim 1, wherein the elevations for the water tables are subtracted from the digital elevation model to generate a fourth map that identify depths of the water tables on the third map.

11. The method of claim 10, further comprising selectively removing negative elevations for the water tables from the fourth map.

12. The method of claim 10, further comprising selectively removing zero elevations for the water tables from the fourth map.

13. The method of claim 10, further comprising using the fourth map for seismic acquisition.

14. The method of claim 1, wherein the satellite image comprises a red spectrum, blue spectrum, and green spectrum.

15. The method of claim 14, further comprising:
    convolving the red spectrum with the green spectrum and the blue spectrum to generate a first intensity map; and
    removing pixels having intensity greater than a first predetermined value from the satellite image.

16. The method of claim 15, wherein the first predetermined value is about 50 percent.

17. The method of claim 14, further comprising:
    convolving the green spectrum with the blue spectrum to generate a second intensity map; and
    removing pixels having intensity greater than a second predetermined value from the satellite image.

18. The method of claim 17, wherein the second predetermined value is about 50 percent.

19. The method of claim 14, wherein generating the first map that identifies the water features on the satellite image comprises:
    convolving the green spectrum with the blue spectrum to generate a third intensity map; and
    removing pixels having intensity greater than a third predetermined value from the satellite image.

20. The method of claim 19, wherein the third predetermined value is about one percent.

21. A non-transitory computer-readable medium having stored thereon computer-executable instructions which, when executed by a computer, cause the computer to:
    receive a satellite image of an area of interest generate a first map that identifies water features on the satellite image;

convolve the first map with a digital elevation model of the area of interest to generate a second map that identifies elevations of the water features on the satellite image;
apply an interpolation algorithm to the second map to generate a third map that identifies water tables and elevations for the water tables on the satellite image; and
subtract the elevations for the water tables from the digital elevation model.

22. The computer-readable medium of claim 21, further comprising instructions which, when executed by the computer, cause the computer to plan a seismic acquisition in the area of interest based at least in part on the third map.

23. A method for mapping water tables, comprising:
receiving a satellite image of an area of interest, wherein the satellite image comprises a red spectrum, a green spectrum and a blue spectrum;
removing noise pertaining to clouds from the satellite image;
removing noise pertaining to ice and snow from the satellite image;
generating a first map that identifies water features on the satellite image;
convolving, using a computer, the first map with a digital elevation model of the area of interest to generate a second map that identifies elevations of the water features on the satellite image;
applying an interpolation algorithm to the second map to generate a third map that identifies water tables and elevations for the water tables on the satellite image;
subtracting the elevations for the water tables from the digital elevation model to generate a fourth map that identifies depths of the water features on the satellite image; and
using the fourth map for seismic acquisition.

* * * * *